Feb. 12, 1963 S. PING, JR 3,077,296
TURBOCHARGER OIL SEAL
Filed April 26, 1961 2 Sheets-Sheet 2

INVENTOR.
SAMUEL PING, JR.
BY
Lockwood, Woodard, Smith & Weikart
Attorneys

United States Patent Office 3,077,296
Patented Feb. 12, 1963

3,077,296
TURBOCHARGER OIL SEAL
Samuel Ping, Jr., Indianapolis, Ind., assignor to Schwitzer Corporation, Indianapolis, Ind., a corporation of Indiana
Filed Apr. 26, 1961, Ser. No. 105,694
5 Claims. (Cl. 230—132)

This invention relates to the sealing of bearing structures against the migration of lubricating or cooling oil or other fluids away from the bearing area. More particularly, the invention is concerned with preventing the flow of lubricating and cooling oil into the compressor portion of a high speed supercharger compressor.

In conventional rotating machinery such as gas turbine driven superchargers, it is customary to provide sleeve or ball bearings lubricated by oil under pressure as a means of sustaining rotation of the main shaft. This lubricating oil must be confined within the bearing area and then carried away to an oil sump. In the case of turbochargers, since entry of lubricating oil into the engine cylinders is highly undesirable, the lubricating oil must be prevented from entering the compressor or turbine housings. In low speed rotating machinery positive contact type oil seals are in general use. However, in high speed applications, as in the case of a turbocharger, the positive contact seals are unsatisfactory because of high friction losses and rapid wear of the contact surfaces.

In the field of application which includes turbochargers, one way in which leakage of oil past the oil seal is prevented involves introducing the outlet pressure of the compressor into the seal area. This arrangement functions satisfactorily under normal conditions of operation wherein a positive pressure always exists at the compressor outlet or in the compressor collector area. However, conditions existing in a diesel engine supercharged by a turbocharger are such that under certain operating conditions of the supercharged engine, the engine aspirates more air flow than can be supplied by the supercharger compressor. Thus, a vacuum condition may at times exist in the compressor housing which can reach magnitudes of 3 to 5 inches of mercury and which makes the problem of designing a non-contact type of oil seal extremely difficult.

Since the pressure existing in the oil drain area is normally atmospheric, or slightly positive, the presence of a sub-atmospheric pressure in the compressor housing actually induces oil leakage into the compressor housing. This adverse condition is accentuated by the use of filters in the compressor air intake passage. These impose an increased amount of pressure drop on the supercharger intake causing the vacuum exerted on the oil seal to increase as the clogging of the air filter increases under normal operation. For example, a new air intake filter on a typical turbocharged diesel engine installation might have a pressure drop such that even when the engine aspirates air in a larger quantity than can be supplied by the turbocharger compressor, the pressure existing in the compressor housing remains very close to atmospheric. However, as the air filter clogs in normal usage, the pressure drop across the filter increases to thereby increase the vacuum existing in the compressor housing under the given air aspirating engine condition. A completely satisfactory oil seal is required to block the entry of oil into the compressor housing even under these aggravated conditions.

For these reasons, it is a primary object of the present invention to provide an oil seal arrangement for rotating machinery which will function properly at high speeds of rotation and under conditions of high pressure differential on opposite sides of the seal.

A further object of the invention is to provide an improved oil seal for use in a centrifugal type compressor.

Still another object of the present invention is to provide an oil seal arrangement employing novel means for deflecting and channeling the oil away from the seal itself in order to eliminate any possibility of vacuum or pressure moving the oil through the seal.

Further objects and advantages will appear as the description proceeds.

The full nature of the invention will be understood from the accompanying drawings and the following description and claims.

Figure 1:
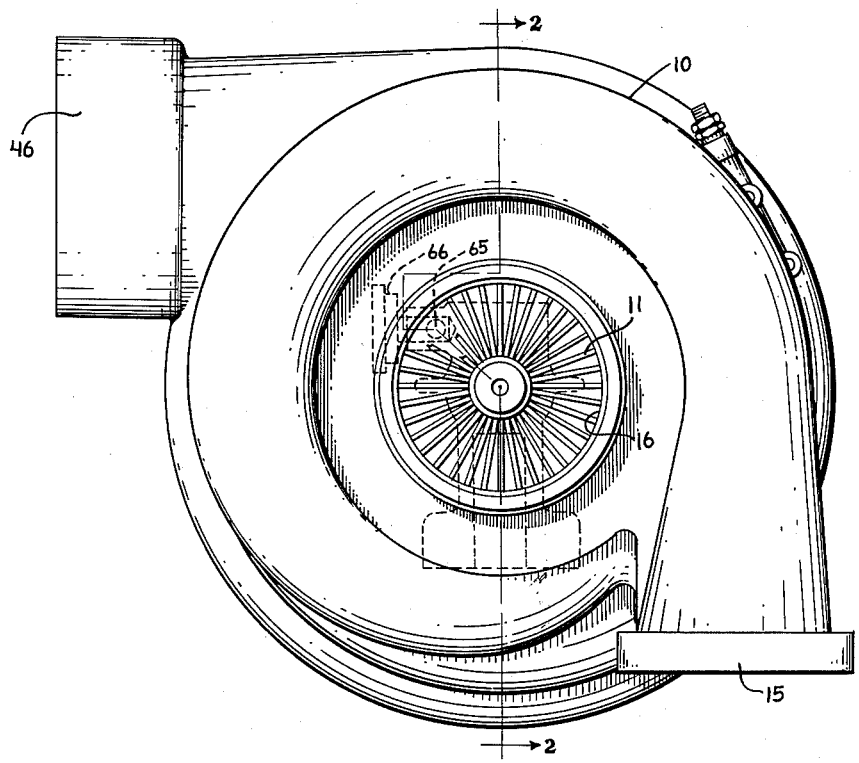
FIG. 1 is an end view of a structure embodying the present invention.
Figure 2:
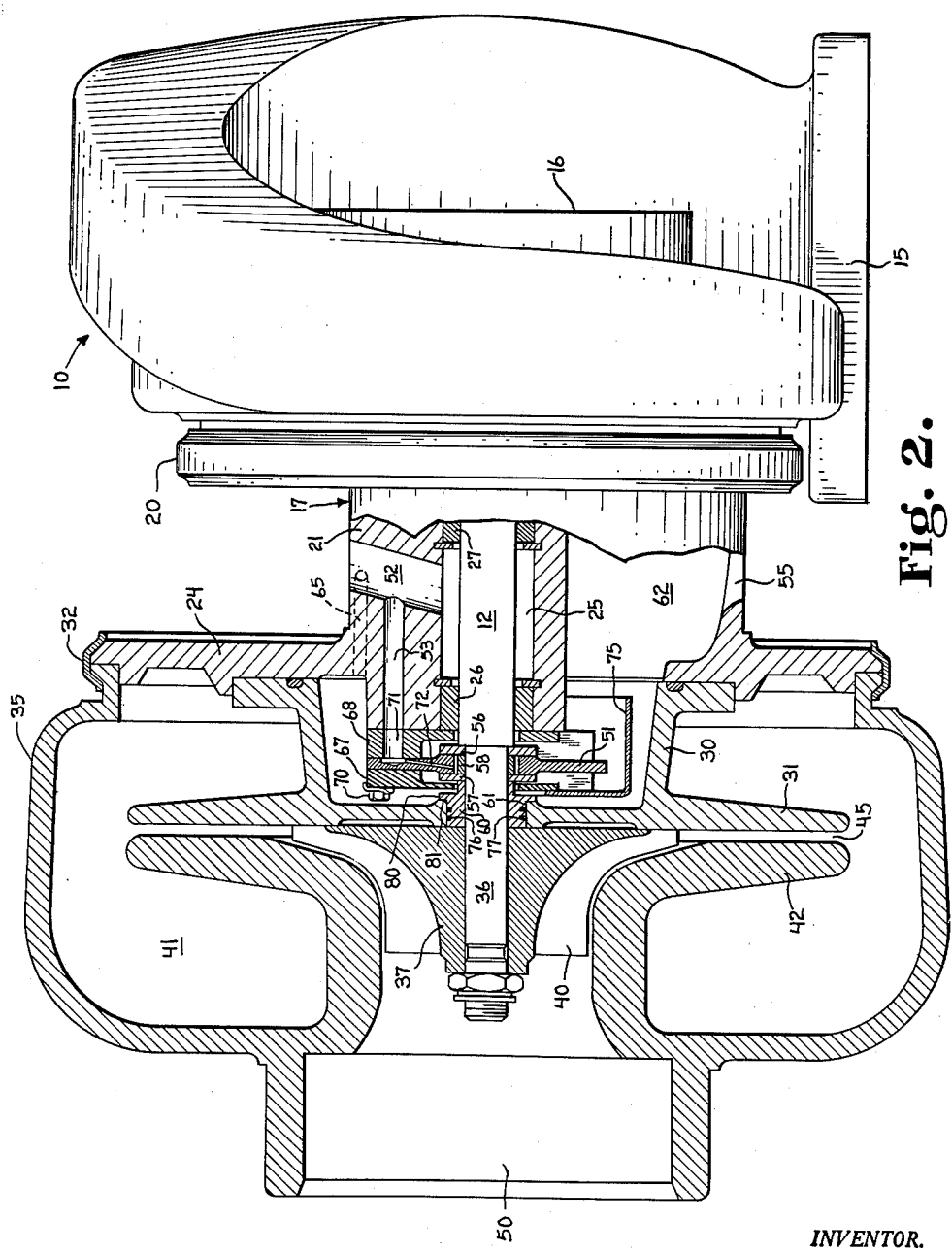
FIG. 2 is a side view partially in section taken generally along the line 2—2 of FIG. 1 and showing particularly the pertinent compressor end portion of the structure.

Referring now more particularly to the drawings, there is illustrated a gas turbine driven supercharger which includes a turbine housing 10 enclosing a conventional bladed turbine wheel 11 adapted to drive the shaft 12. The turbine housing is provided with a flanged inlet passage 15 which transmits engine exhaust gases to the turbine wheel. The turbine, itself, is of conventoinal construction and operates in conventional manner, that is, high pressure gases entering the turbine are expanded through the turbine wheel causing rotation thereof, the spent gases being discharged through the turbine outlet passage 16.

Attached to the turbine housing 10 is an intermediate casting and bearing housing 17, the two castings being retained together in sealed relation by means of a clamp ring 20. The casting 17 is asymmetrical in configuration and includes a central portion 21 and an outwardly flanged portion 24 at one end of the central portion. The central portion 21 is provided with an aperture 25 through which the shaft 12 extends. Within this aperture, the central portion 21 carries conventional rotary bearings 26 and 27 which allow free rotation of the shaft 12.

Bolted to the flanged portion 24 of the casting 17 is a compressor back plate casting 30 having an outwardly flanged section 31. Also attached to the portion 24 of casting 17 by means of a clamp ring 32 is a compressor cover casting 35. The shaft 12 has an extending portion 36 of reduced diameter, said extending portion having mounted thereon a centrifugal type compressor rotor or wheel 37 carrying a plurality of blades 40. The compressor casting 35 is formed to provide a generally annular collector area 41 which receives high pressure gases delivered from the compressor.

The casting 35 is further formed with an internal annular flange 42 which cooperates with the flange 31 of the casting 30 to provide an annular diffuser passage 45 leading from the compressor wheel 37 to the collector area 41. The collector area 41 communicates with a tangentially extending outlet or discharge passage 46 (FIG. 1), the passage 46 being connected by suitable tubing to the intake manifold of an internal combustion engine served by the turbocharger.

The compressor housing casting 35 is flanged to provide an inlet passage 50 which communicates with atmosphere or with the air induction system of the engine served by the turbocharger. When the engine upon which the turbocharger is installed is in operation, the exhaust gases will rotate the turbine wheel 11 to drive the compressor wheel 37. Rotation of the compressor wheel will charge the engine with compressed air thereby forcing into the engine cylinders a greater amount of air than could be drawn thereinto by the pumping action of the engine pistons. This charging action combined with increased fuel supply to the engine cylinders produces the increased power characteristic of supercharged engines.

There has been above described a generally conventional turbocharger and its operation has been referred to without reference to the seal arrangement of the present invention. The journal bearings 26 and 27 and the thrust bearing member 51 are supplied with lubricating and cooling oil under pressure by means of passages 52 and 53 in the bearing housing casting 17. This oil circulates through the bearing area and exits through an aperture 55 to a suitable sump not shown. The seal arrangement of the present invention prevents this oil from migrating to the compressor housing and to the compressor wheel along the shaft 12.

Received in fixed relation upon the reduced diameter portion 36 of the shaft 12 are a pair of thrust rings 56 and 57, a spacer 58 between the thrust rings and a bearing sleeve 60, each of these parts rotating with the shaft. The bearing sleeve 60 is received within an aperture 61 in the back plate housing, said aperture receiving the shaft 12 as well as the sleeve bearing 60 and leading between the compressor and an oil cavity 62 formed within the bearing housing 17 and by the bearing housing with the back plate casting 30. As has been mentioned above, under certain conditions of operation, there is a vacuum existing in the compressor housing which tends to draw fluid from the oil cavity 62 into the compressor housing.

In order to provide a fluid other than oil for satisfying this vacuum, there is formed a passage 65 which communicates between the oil cavity 62 and a conventional breather element 66 threadedly received in the bearing housing 17. This breather 66 is provided with a filter which insures that any air passing through the breather element into the oil cavity is clean and dust free. It can be appreciated that the air flow from the breather into the oil cavity will satisfy the vacuum in the compressor housing, thus preventing the pulling of any oil droplets between the bearing 60 and the back plate housing and through the aperture 61.

The thrust bearing 51 is sandwiched between a pair of oil retainers 67 and 68, all of the parts 51, 67 and 68 being fixedly secured to the bearing housing by means of suitable cap screws 70. These oil retainers 67 and 68 have a cup shape which is machined away at its lower portion to form a downwardly opening container. The oil under pressure within the passage 53 passes into the thrust bearing member 51 through the passage 71 in the oil retainer 68. The thrust bearing member 51 is formed with a generally radially extending passage 72 which leads to the inside of the thrust bearing. After leaving passage 72, the oil flows axially along the outside diameter of spacer 58 and then passes radially outwardly between the thrust bearing side faces and the thrust rings into the downwardly opening cup-shaped container formed by the oil retainers 67 and 68. The thrust bearing arrangement provided by the member 51 and rings 56—57 is disclosed and claimed in the copending patent application of James R. Harper titled "Thrust Bearing For Turbochargers," filed April 28, 1961, Serial No. 106,234, and assigned to the assignee of the present invention.

A certain amount of the oil coming into the bearing housing under pressure through the passage 52 will move into the aperture 25 and past the bearings 26 and 27 for lubrication thereof and then will move into the oil cavity 62, the portion of the oil lubricating the bearing 26 passing between the shaft and the oil retainer 68 and downwardly through the container formed by the oil retainers.

Fixed to the oil retainers is an oil deflector 75 having a generally half-cup configuration, the concave portion of the deflector opening away from the aperture 61 and covering the downwardly facing opening of the container formed by the oil retainers. It can be appreciated that oil flowing downwardly into this container will be channelled and directed toward the exit aperture 55 of the oil cavity. Without such a deflector, the oil flowing from the container would strike the compressor back plate and rebound randomly permitting a portion of the oil to be introduced into aperture 61.

It should be noted that the sleeve 60 is provided with an outwardly facing annular cavity 76 which receives a piston ring seal 77 acting to inhibit the tendency of oil to flow through the aperture 61. There is also provided in integral relation with the bearing 60 a radially outwardly extending flange or flinger 80 which rotates with the shaft 12 and is positioned in close clearance to a stationary face or collar 81 of the back plate housing. As the bearing 60 rotates with the shaft, this flange 80 operates to fling outwardly any oil which has managed to pass axially along the outer surface of the portion of the sleeve 60 which extends inboard of the flange 80. This oil then passes along the generally horizontal portion of the collector back plate to the oil cavity exit 55.

From the above description, it can be appreciated that the baffling arrangement provided by the retaining members 67 and 68 and the flinger action of flange 80 prevent the entry of lubricating and cooling oil into the area adjacent the piston ring seal 77, although air may be drawn therethrough when sub-atmospheric pressure exists adjacent the compressor wheel. The members 67 and 68 provide an enclosing hood over the thrust bearing members 56, 57 and 51, and this hood captures and directs downwardly the lubricating and cooling oil issuing from both the journal bearing 26 and the thrust bearing assembly 56, 57 and 51. By thus directing the flow of oil issuing from these bearings, the area within the compressor back plate casting and above the members 56 and 57 is kept free of oil. By venting this area to atmosphere, by means of passage 65 for example, the existence of a sub-atmospheric pressure in the compressor housing will tend to pull oil free air along the shaft rather than oil droplets from the thrust and journal bearings as would be the case in conventional constructions. The flange 80, rotating closely adjacent a portion of the compressor back plate casting acts as a final barrier to any oil which has moved axially past the outboard oil retaining member 67. The novel oil deflecting and channelling arrangement is capable of functioning properly at high speeds of rotation and under conditions of relatively high vacuum in the compressor housing.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a turbocharger compressor of the type wherein a centrifugal type compressor wheel is rotated by rotation of a compressor wheel shaft and means enclosing the compressor wheel defines a compressor area adjacent the wheel which is intermittently at sub-atmospheric pressure; the combination with said shaft and compressor area of: an oil lubricated thrust bearing supporting said shaft exteriorly of but adjacent to said compressor area, an enclosing housing for said thrust bearing, said shaft extending through a housing wall and into the compressor area, oil deflecting elements supported within said housing, said elements being positioned in spaced overlying relation to the upper marginal portion of the thrust bearing to thereby provide a hood for collecting and directing downwardly any oil moving radially upwardly from the thrust bearing, a deflector supported adjacent said hood having a portion extending across the open lower end of said hood and away from the opening in said housing through which said shaft extends, a flange adapted to rotate with said turbocharger shaft closely adjacent the housing wall through which said shaft extends and exteriorly of the hood formed by said elements, said rotating flange serving to fling radially outwardly any oil moving to the adjacent exterior surface of said hood, and means for venting to atmosphere the portion of said housing above said hood to relieve any pressure drop within the housing caused by the existence of sub-atmospheric pressure in said compressor area.

2. In a turbocharger compressor of the type wherein a centrifugal type compressor wheel is rotated by rotation of a compressor wheel shaft and means enclosing the compressor wheel defines a compressor area adjacent the wheel; the combination with said shaft and compressor area of: an oil lubricated thrust bearing supporting said shaft exteriorly of but adjacent to said compressor area, and enclosing housing for said thrust bearing, said shaft extending through a housing wall and into the compressor area, oil deflecting elements supported within said housing, said elements being positioned in spaced overlying relation to the upper marginal portion of the thrust bearing to thereby provide a hood for collecting and directing downwardly any oil moving radially upwardly from the thrust bearing, a deflector supported adjacent said hood having a portion extending across the open lower end of said hood and away from the opening in said housing through which said shaft extends, a flange adapted to rotate with said shaft closely adjacent the housing wall through which said shaft extends and exteriorly of the hood formed by said elements, said rotating flange serving to fling radially outwardly any oil moving to the adjacent exterior surface of said hood.

3. In a support structure for a rotating shaft which extends into an area which is intermittently at sub-atmospheric pressure; the combination with said shaft of: an oil lubricated thrust bearing supporting said shaft exteriorly of but adjacent to said area, an enclosing housing for said thrust bearing, said shaft extending through a housing wall, oil deflecting elements supported within said housing, said elements being positioned in spaced overlying relation to the upper marginal portion of the thrust bearing to thereby provide a hood for collecting and directing downwardly any oil moving radially upwardly from the thrust bearing, a deflector supported adjacent said hood having a portion extending across the open lower end of said hood and away from the opening in said housing through which said shaft extends, a flange adapted to rotate with said shaft closely adjacent the housing wall through which said shaft extends and exteriorly of the hood formed by said elements, said rotating flange serving to fling radially outwardly any oil moving to the adjacent exterior surface of said hood, and means for venting to atmosphere the portion of said housing above said hood to relieve any pressure drop within the housing caused by the existence of sub-atmospheric pressure in said area.

4. In a support structure for a rotating shaft; the combination with said shaft of: an oil lubricated thrust bearing supporting said shaft, an enclosing housing for said thrust bearing, said shaft extending through a housing wall, oil deflecting elements supported within said housing, said elements being positioned in spaced overlying relation to the upper marginal portion of the thrust bearing to thereby provide a hood for collecting and directing downwardly any oil moving radially upwardly from the thrust bearing, a deflector supported adjacent said hood having a portion extending across the open lower end of said hood and away from the opening in said housing through which said shaft extends, a flange adapted to rotate with said shaft closely adjacent the housing wall through which said shaft extends and exteriorly of the hood formed by said elements, said rotating flange serving to fling radially outwardly any oil moving to the adjacent exterior surface of said hood.

5. In a support structure for a rotating shaft; the combination with said shaft of: an oil lubricated thrust bearing supporting said shaft, an enclosing housing for said thrust bearing, said shaft extending through a housing wall and into an area which is intermittently at sub-atmospheric pressure, oil deflecting elements supported within said housing, said elements being positioned in spaced overlying relation to the upper marginal portion of the thrust bearing to thereby provide a hood for collecting and directing downwardly any oil moving radially upwardly from the thrust bearing, a deflector supported adjacent said hood having a portion extending across the open lower end of said hood and away from the opening in said housing wall through which said shaft extends, and means for venting to atmosphere the portion of said housing above said hood to relieve any pressure drop within the housing caused by the existence of sub-atmospheric pressure on the remote side of said housing wall.

References Cited in the file of this patent

UNITED STATES PATENTS

| | | |
|---|---|---|
| 872,365 | Ver Planck | Dec. 3, 1907 |
| 2,008,527 | Warren | July 16, 1935 |